United States Patent Office 2,731,687
Patented Jan. 24, 1956

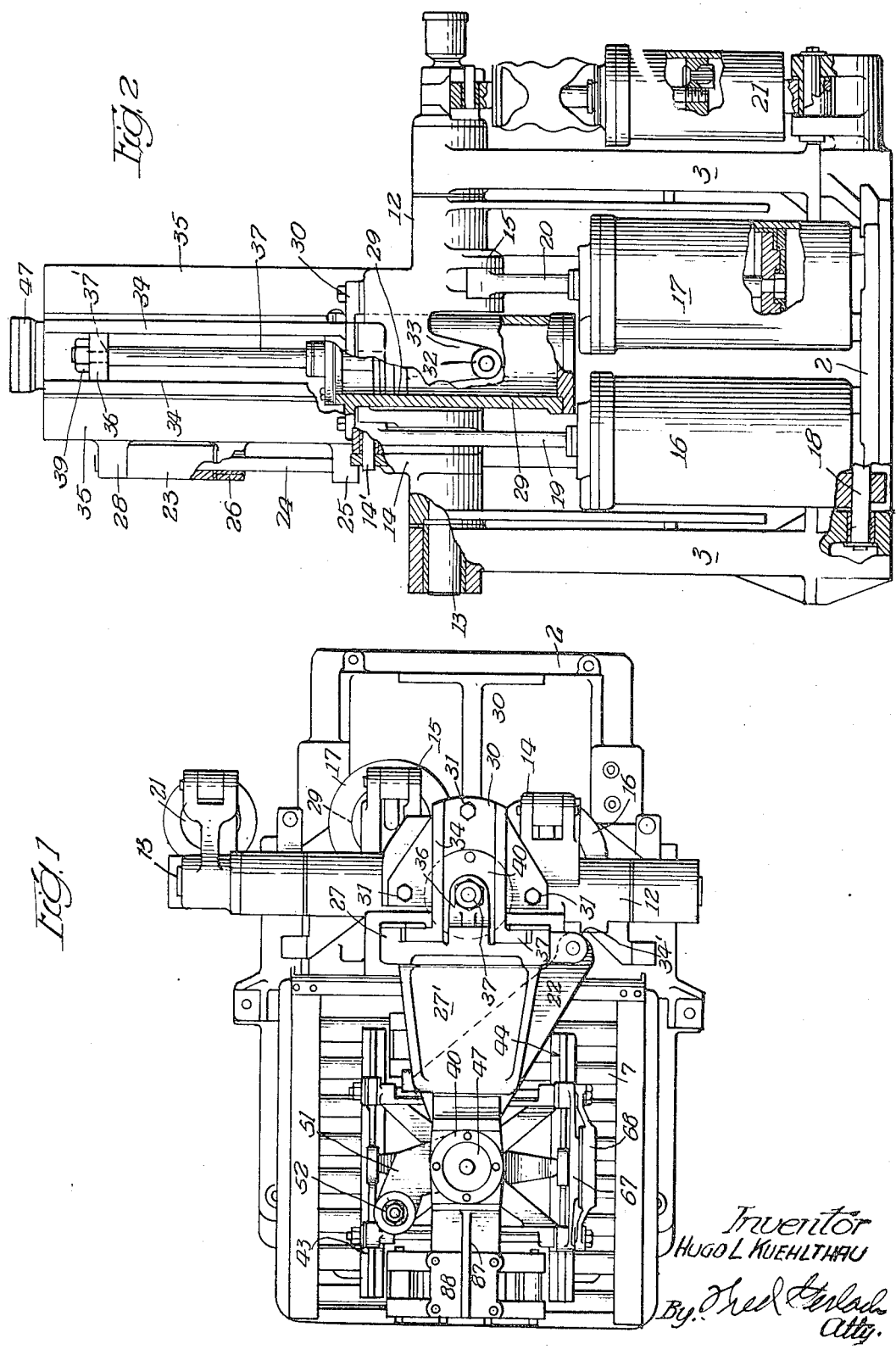

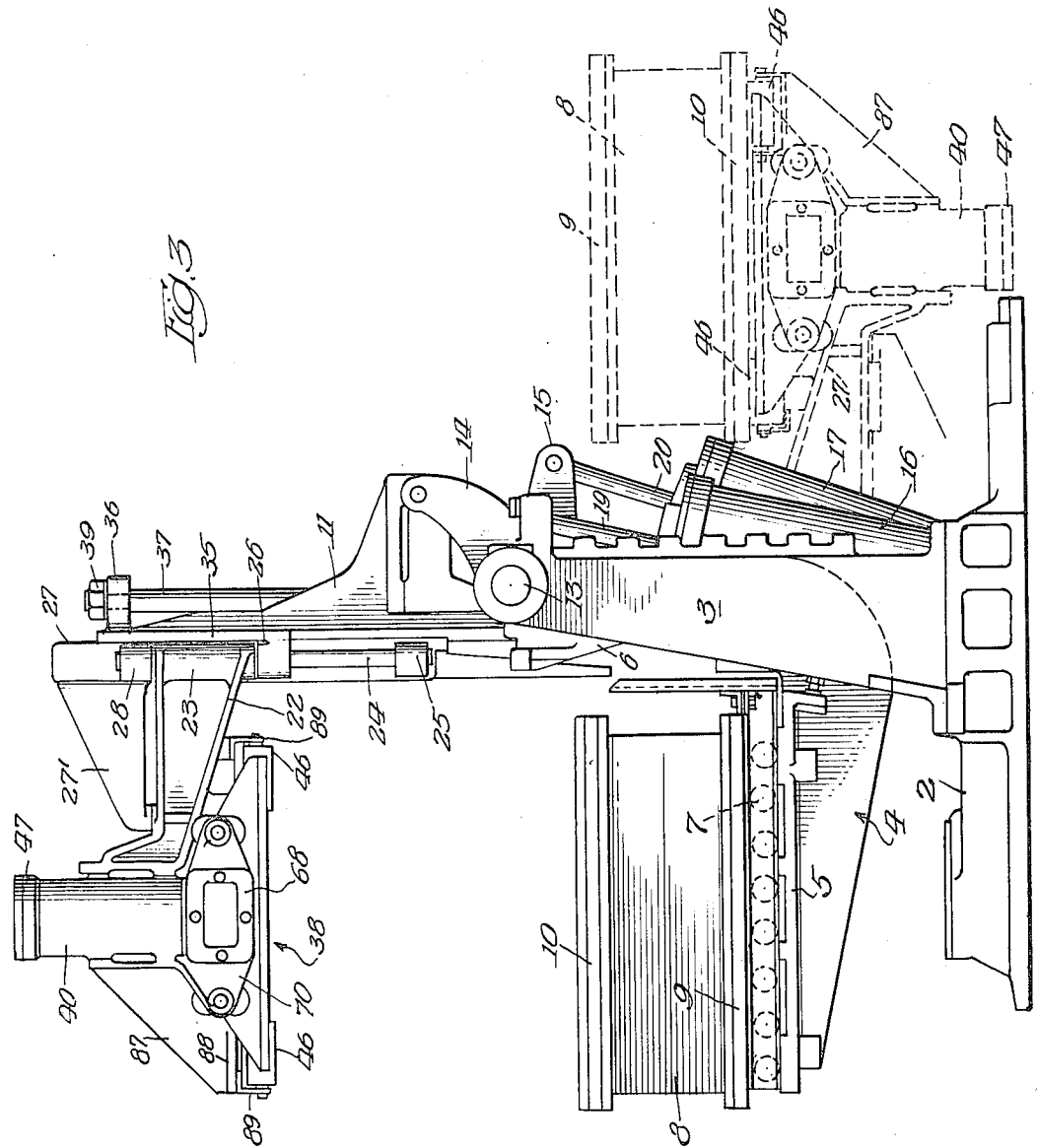

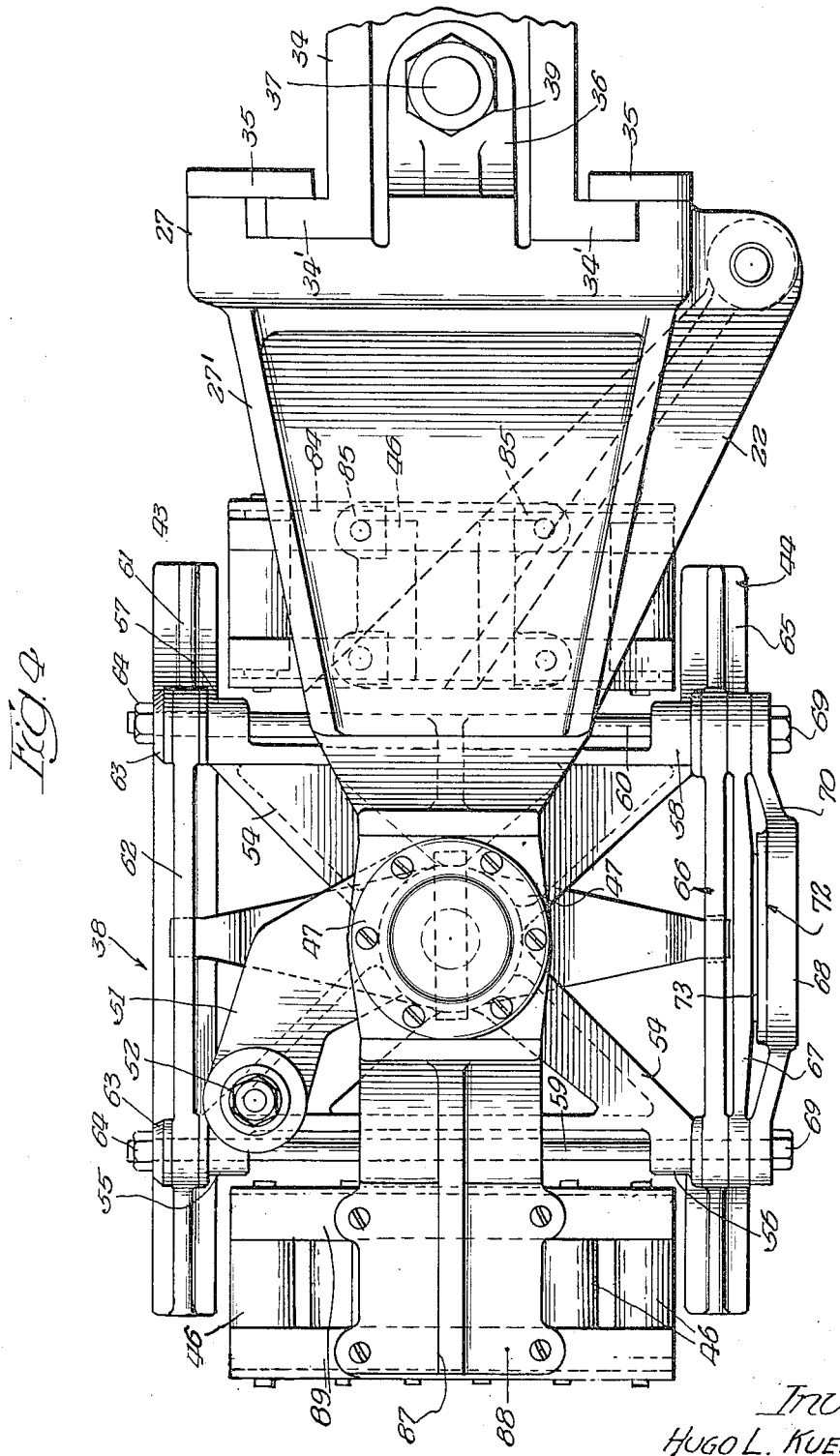

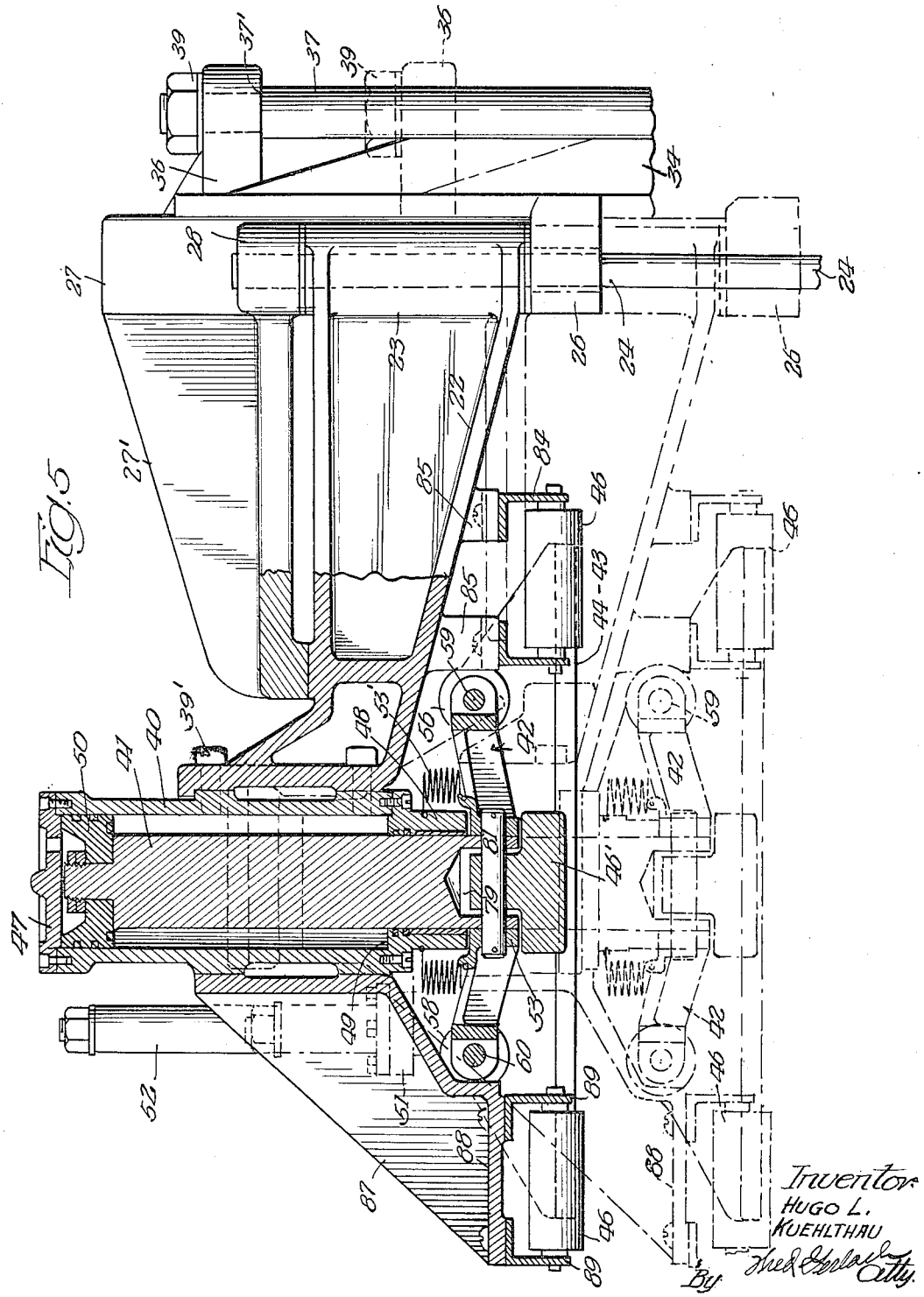

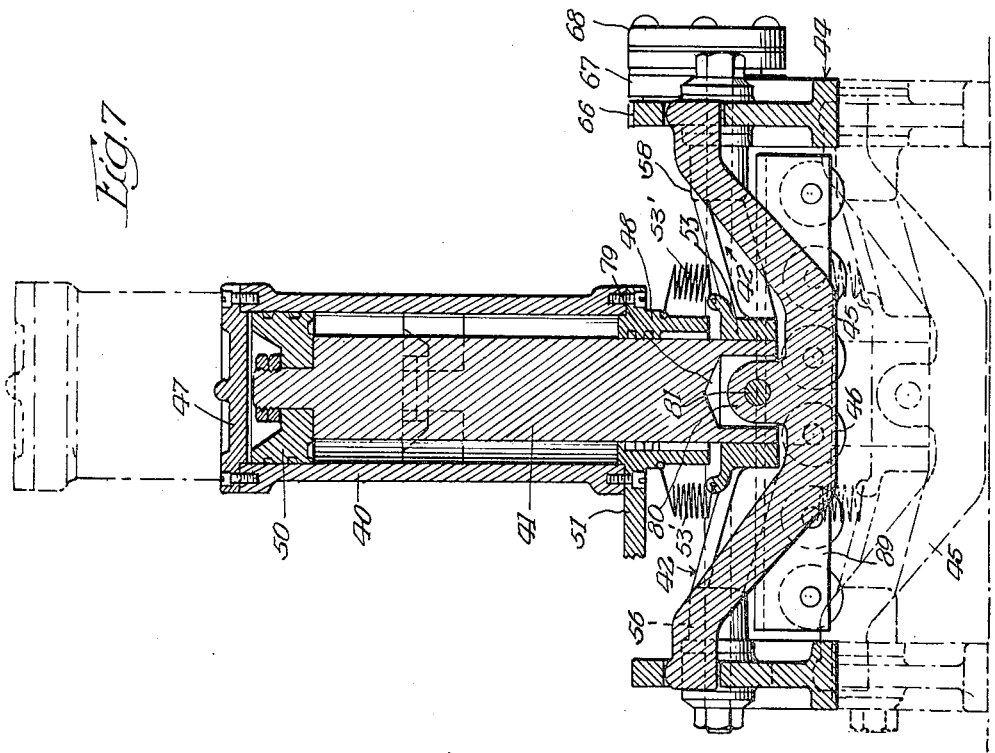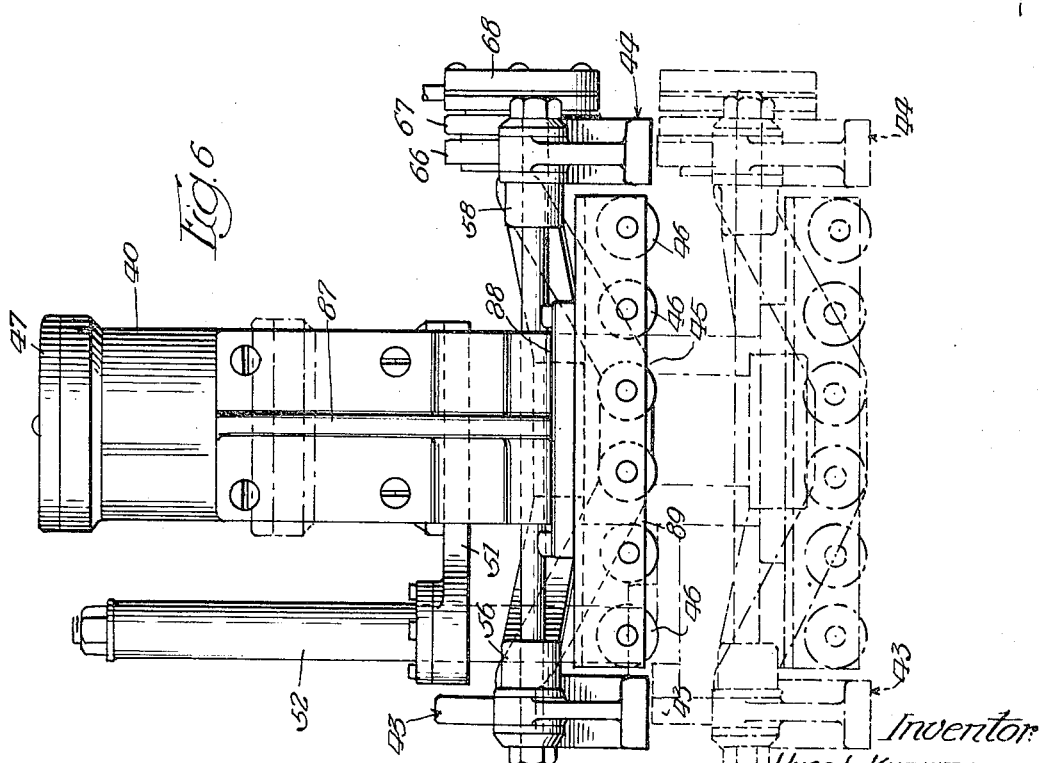

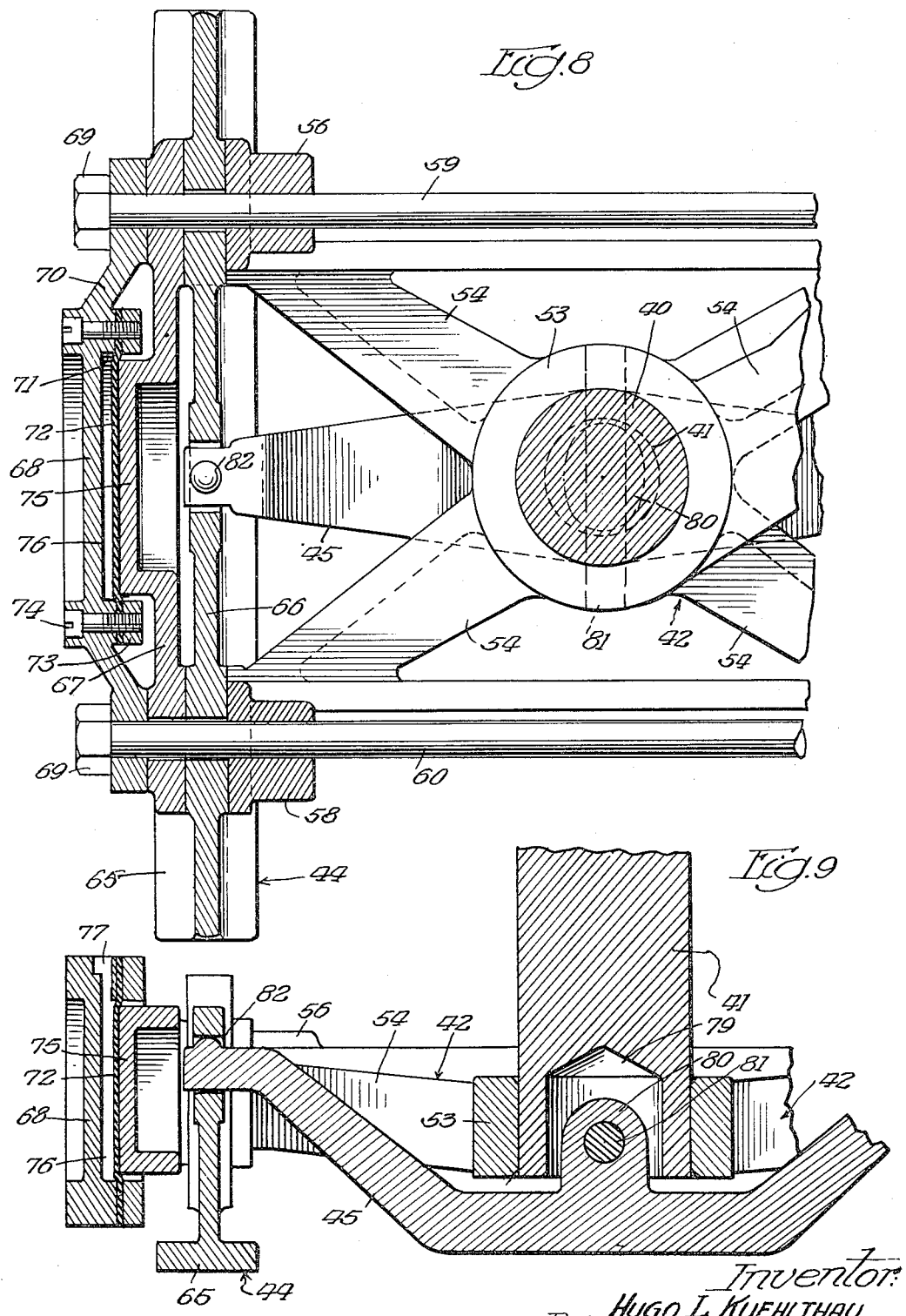

2,731,687

MOLDING MACHINE

Hugo L. Kuehlthau, Elmhurst, Ill., assignor to Pettibone Mulliken Corporation, Chicago, Ill., a corporation of Delaware Application August 14, 1952, Serial No. 304,318

8 Claims. (Cl. 22—42)

The present invention relates to molding machines, and is particularly concerned with means for clamping a flask in the machine and means for subsequently removing the flask from the machine.

Although the illustrations show a molding machine of the roll-over or tilt type in which a flask containing a mold and a pattern is placed on the table, and which requires no jolting, it will be apparent that the advantages of the present invention may be utilized in other types of molding machines, which may have jolting mechanism incorporated therein.

In conventional molding machines, where a clamping head must be moved towards a fixed support to clamp a flask therebetween, the vertical movement of the clamping head is limited by the stroke of the piston which moves it. This condition does not cause any difficulty where the flasks are of approximately uniform height, but becomes quite troublesome when the flasks vary materially in height. Another difficulty with molding machines of the type heretofore known is the fact that the movable clamping head does not rest firmly on all portions of the flask board with which it contacts, particularly if the flask board is not absolutely level. In addition to the above mentioned defects of conventional molding machines, the removal of the flask, which is filled with sand and has considerable weight, requires a substantial amount of labor and therefore slows down the operation of the machine.

It is an object of the invention to provide hydraulic means, independent of the clamping means, for positioning the head of the machine to enable it to operate efficiently with flasks of various heights.

Another object of the invention is to provide means for equalizing the pressure on the clamping shoes which clamp the flask in the machine.

Another object is to provide take-off rollers to facilitate sliding the flask laterally onto a conveyor.

Other objects of the invention, and the various advantages of the present molding machine will become apparent upon reading the following description, taken in conjunction with the accompanying drawings, in which:

Fig. 1 is a top plan view of the molding machine embodying the invention;

Fig. 2 is a rear elevational view of the machine;

Fig. 3 is a side elevational view of the machine with the inverted position of the flask, clamp arm, and head shown in dotted lines;

Fig. 4 is a fragmentary top plan view of the head and clamp arm structure;

Fig. 5 is a fragmentary side view, partly in elevation and partly in section, showing the positioning cylinder, the clamp arm, the head, and the rollers, with different positions of the head shown in dotted lines;

Fig. 6 is a front elevational view of the clamping head, with dotted lines indicating different relative positions of the clamping shoes and the rollers;

Fig. 7 is a vertical sectional view of the structure shown in Fig. 6;

Fig. 8 is a fragmentary cross sectional view showing portions of the head; and

Fig. 9 is a vertical sectional view through the structure shown in Fig. 8.

Referring to the drawings, the molding machine comprises a supporting structure 2 having a pair of laterally spaced standards 3 which support a table 4. The table 4 includes a horizontal portion 5 and an upright portion 6. The horizontal portion 5 is provided with a plurality of rollers 7 so that a flask 8 can be easily rolled into place on the table. The flask rests on a pattern board 9 and is filled with sand previously packed against the pattern. The pattern board is interlocked with the table 4 in conventional manner. If the machine is to be used with flasks in which the sand is not previously packed, conventional jolting mechanism may be provided to pack the sand around the pattern after the flask has been positioned on the table. The top side of the flask is covered with a flask board 10.

A framework 11 extends upwardly above the standards 3 and both the upright portion 6 of table 4 and the lower portion of framework 11 are rigidly secured to a cradle 12 pivotally mounted on a horizontal shaft 13 rotatably mounted in the upper portion of standards 3 (Fig. 2). The cradle is provided with two pairs of lugs 14 and 15 which are positioned adjacent opposite ends of the cradle and each pair is circumferentially spaced relative to the other. A pair of cylinders 16 and 17, disposed angularly with respect to standards 3, are rotatably supported by a shaft 18 (Fig. 2) having its opposite ends mounted in the standards 3 adjacent the lower edge thereof. A piston rod 19 extending through the top of cylinder 16 is connected at its end to the lugs 14 by means of a pin 14' (Fig. 2), and a piston rod 20, extending through the top of cylinder 17 is similarly connected at its end to the lugs 15. The cylinders 16 and 17, and their piston rods 19 and 20, cooperate to rotate the cradle 12 about the shaft 13 through an angle of 180° to invert the table 4, framework 11, and the various structural elements, hereinafter described, so that a flask 8 initially positioned on the table, as shown in solid lines in Fig. 3, is inverted on the opposite side of the standards 3. A conventional dash pot 21 (Fig. 2) is connected to the shaft 13 to cushion the roll-over movement. After the roll-over the mold is drawn, and the clamping head and flask are positioned as indicated in dotted lines in Fig. 3.

A swingable clamp arm 22 is provided with an integral vertical sleeve 23 loosely mounted on a post 24, whereby the clamp arm may be swung in a horizontal plane around the post 24. The post 24 is mounted in lugs 25, 26 and 28 which are integral with a bracket 27 which has an angular plate 27' positioned just above the top surface of the swingable clamp arm 22. The plate 27' is provided with stop members (not shown) to limit the swinging movement of clamp arm 22. A draw and clamp cylinder 29 is secured to the cradle 12 by a collar 30 secured to the cradle by bolts 31 (Fig. 1). Another bolt 32 passing through a lug 33 integral with the cradle 12 also helps to secure the cylinder 29 in place. A pair of flanges 34 cast integrally with the cylinder 29 project vertically above the cylinder in laterally spaced relationship and extend outwardly, as shown at 34' (Fig. 4) to form a guideway for the bracket 27. The rear edge of the bracket 27 has extensions 35 embracing the rear edges of the outwardly projecting portions 34' of the flanges 34. The bracket 27 also has an integral apertured lug 36 projecting between the flanges 34. A piston rod 37 extending through the top of cylinder 29 also extends through the aperture in lug 36. The end of piston rod 37 passing through the aperture in lug 36 is of reduced diameter to provide a shoulder 37' (Fig. 5) in engagement with the bottom surface of lug 36. A nut 39 threaded on the end of piston rod 37 holds the lug 36 against the shoulder 37' to cause the bracket 27, and consequently the clamp arm 22 to reciprocate vertically with the reciprocation of the piston rod 37.

The clamping head 38 which is secured to the swingable clamp arm 22 by means of a plurality of bolts 39' (Fig. 5) comprises a fixed cylinder 40, a piston rod 41 reciprocable in the cylinder, a spider 42, a pair of clamping shoes 43 and 44, an equalizer bar 45, and a plurality of rollers 46.

The upper end of cylinder 40 is closed by a cap plate 47 and the lower end, through which the piston rod 41 extends, is provided with a collar 48 which provides a shoulder 49 for limiting the downward motion of the piston 50. An arm 51, integral with the collar 48, extends laterally therefrom, and is provided at its outer end with an aperture through which a guide post 52 extends. The guide post is mounted on the spider and slides through the aperture in arm 51 to prevent any rotation of the movable parts of the clamping head as they are reciprocated by the piston rod 41.

The spider 42 is provided with a hub 53 which fits around the lower end portion of piston rod 41 and is rigidly secured thereto, preferably by welding. Downward movement of the piston rod 41 projects its lower end, to which the spider 42 is fixed, below the lower edge of the collar 48. In order to protect this portion of the piston rod from dirt and dust an annular bellows type boot 53' has its upper edge secured to the collar 48 and its lower edge secured to the spider 42. The spider has four arms 54 extending outwardly from the hub at 90° to each other and having sleeves 55, 56, 57 and 58 arranged parallel to each other at the outer ends of the sleeves. Sleeves 55 and 56 are in axial alignment with each other and are positioned at opposite edges of the head adjacent one end of the head. Sleeves 57 and 58 are similarly arranged adjacent the opposite end of the head.

A tie rod 59 is mounted in axially aligned sleeves 55 and 56 and a similar tie rod 60 is mounted in the axially aligned sleeves 57 and 58 (Fig. 4). Opposite ends of each tie rod project beyond the ends of the sleeve in which it is mounted and the projecting ends of the tie rods are threaded. The clamping shoe 43 comprises a foot portion 61 and a centrally disposed longitudinally extending web portion 62 upstanding therefrom. The web 62 is apertured and fits loosely on the end portions of tie rods 59 and 60 projecting beyond the outer ends of sleeves 55 and 57, respectively. Washers 63 are positioned on rods 59 and 60 adjacent the outer edge of web 62 and a nut 64 is threaded on the end of each rod to hold the shoe 43 between the sleeves 55, 57 and the washers 63. The clamping shoe 44 is a duplicate of the shoe 43 and has a foot portion 65 and a web 66. The web 66 is apertured to fit loosely on the end portions of tie rods 59 and 60 projecting beyond the outer ends of sleeves 56 and 58, respectively. The apertures in webs 62 and 66 extend vertically so that either end of either shoe may move vertically relative to the other shoe or to the opposite end of the same shoe. This permits both shoes to adjust themselves automatically to conform to any irregularity or deviation from the horizontal plane of the flask board 10.

A plate 67 positioned adjacent shoe 44 is provided with apertured end portions fitting on the tie rods 59 and 60. Another plate 68, also provided with apertured end portions is positioned on tie rods 59 and 60 adjacent the plate 67. Nuts 69 threaded on the ends of tie rods 59 and 60 which project beyond the plate 68 secure the plates 67 and 68 against the shoe 44. The portions of plate 68 adjacent the apertures extend outwardly at a slight angle, as indicated at 70, Figs. 4 and 8, and the central portion thereof is provided with a peripheral flange 71. A diaphragm 72 is secured against the flange 71 by a strip 73 fitting against the flange 71 and secured thereto by a plurality of bolts 74. The center portion of plate 67 extends outwardly, as indicated at 75 (Fig. 8), to bring it into contact with the diaphragm 72. The space 76 between the diaphragm 72 and the center portion of plate 68 is provided with an air inlet 77 (Fig. 9) through which air may be forced.

When air is forced through inlet 77 into the space 76 it tends to separate the plate 68 and the diaphragm 72. This action presses the ends of plate 67 and web 66 of shoe 44 against the sleeves 56 and 58 with sufficient frictional force to prevent either vertical or lateral movement of the shoe 44 relative to tie rods 59 and 60. At the same time the outward pressure against plate 68 causes it to press against the nuts 69 and thereby pull both tie rods 59 and 60 towards the left, as viewed in Fig. 8. This action pulls the nuts 64 and washers 63 against the web 62 of shoe 43 and locks it against vertical or lateral movement relative to the tie rods. When the air is released from the space 76 both shoes are loosely held on the tie rods so that they may be free to move within the limits of the apertures in their webs 62 and 66.

The clamping action of the shoes 43 and 44 against the flask would normally transmit considerable stress to the ends of the arms 54 of the spider 42. The spider is a casting and can not efficiently stand such stresses which may be concentrated at any one of the arms. Accordingly, I have provided an equalizer bar 45 which equalizes the pressure and transmits the clamping force to the piston rod 41 instead of to the spider. The piston rod is capable of withstanding the clamping force without damage.

The lower end of piston rod 41 is recessed, as indicated at 79 (Figs. 5 and 9), to receive an upstanding lug 80 integral with the center of the equalizer bar 45. The lug 80 is apertured and is pivotally mounted on a pin 81 which extends through the piston rod 41 and the hub 53 of spider 42. The ends of pin 81 project beyond the hub 53 and are secured in any suitable manner. The recess 79 is sufficiently large, relative to the lug 80, to permit the equalizer bar 45 to move pivotally about pin 81 without interference. The equalizer bar extends transversely relative to the shoes 43 and 44 and the opposite ends of the bar fit loosely into apertures 82 provided in the central portion of each web 62 and 66 of the clamping shoes. The apertures 82 are slightly higher than the thickness of the ends of the equalizer bar so that either shoe may tilt vertically with respect to the equalizer bar.

A plurality of rollers 46, arranged transversely adjacent one edge of the head 38, are rotatably supported in a pair of brackets 84. The brackets 84 are rigidly secured to flanges 85 depending from the underside of the swingable clamp arm 22. Another set of rollers 46 is mounted at the opposite edge of the head 38. A bracket 87 rigidly secured to the cylinder 40 has a horizontal flange 88 which carries a pair of brackets 89 in which the rollers 46 are mounted. As shown in Fig. 5, the rollers 46 are parallel and lie in the same horizontal plane with the lowermost surface of the rollers slightly below the lowermost surface of the clamping shoes 43 and 44 when the piston rod 41 is in its uppermost position.

The mechanism for operating the various pistons and cylinders is conventional and is not shown. When a flask is positioned on the table 4, the piston rod 41 is actuated to move it downwardly if the distance between the clamping shoes 43 and 44 and the flask board 10 is greater than the length of the stroke of piston rod 37. The downward movement of piston rod 41 moves the spider 42, the clamping shoes 43 and 44, and the equalizer bar 45 downwardly, but does not move the rollers 46. When the clamping shoes are within the desired range of the piston rod 37 the control valve (not shown) actuating the piston rod 41 is closed, thereby locking the piston rod in position. The piston rod 37 is then actuated until the clamping shoes 43 and 44 engage the flask board 10 and hold the flask 8 securely against the table 4. Air is then forced into inlet 77 to lock the clamping shoes in clamping position. The head 38 and the table 4, with the flask 8 securely clamped therebetween, are then rotated through 180° to invert the flask. The cylinders 16 and 17, which control the rotation of the flask, are filled with oil on both sides of their pistons so that the flask is inverted without bouncing. The oil removed from one end of the cylinder is forced into the opposite end so that the movement of each piston rod is firmly controlled. After the flask is inverted the piston rod 41 is again actuated, to move the clamping shoes downwardly below the uppermost surface of the rollers 46. The flask 8 moves downwardly with the clamping shoes until the flask board 10 engages the rollers 46. Meanwhile the pattern board 9, which is interlocked with the table 4 remains stationary and the pattern is drawn from the flask. When the flask, which is filled with the sand mold and is consequently quite heavy, comes to rest on the rollers 46 it may be easily rolled onto a conveyor.

From the foregoing it will be seen that the structure of the present invention provides efficient positioning means for the head of the machine, means for equalizing the pressure on the clamping shoes and transmitting the load to a piston better able to carry it than the spider which would otherwise carry it, means for locking the equalizing means and the shoes in clamping position, and roller means for facilitating removal of the flask from the machine.

Although I have described a preferred embodiment of the invention in considerable detail, it will be understood that the description thereof is intended to be illustrative, rather than restrictive, as many details may be modified or changed without departing from the spirit or scope of the appended claims. Accordingly, I do not desire to be restricted to the exact details of construction described.

I claim:

1. In a molding machine, a head comprising a fixed cylinder, a piston vertically reciprocable in said cylinder, a spider rigidly secured to said piston, said spider having a pair of axially aligned sleeves at opposite edges of said head, a tie rod extending through each pair of sleeves, a pair of parallel clamping shoes arranged transversely of said tie rods adjacent opposite ends thereof, each of said shoes having its opposite ends mounted on corresponding ends of opposite tie rods, each of said shoes being provided with a centrally disposed slot, and an equalizer bar pivotally secured to said spider, the opposite ends of said equalizer bar engaging the centrally disposed slots of said shoes.

2. In a molding machine, a head comprising a spider having a pair of axially aligned sleeves at opposite edges of said head, a tie rod extending through each pair of sleeves, a pair of parallel clamping shoes arranged transversely of said tie rods adjacent opposite ends thereof, each of said shoes having its opposite ends mounted on corresponding ends of opposite tie rods, each of said shoes being provided with a centrally disposed slot, and an equalizer bar pivotally secured to said spider, the opposite ends of said equalizer bar engaging the centrally disposed slots of said shoes.

3. In a molding machine, a head comprising a fixed cylinder, a piston vertically reciprocable in said cylinder, a spider rigidly secured to said piston, said spider having a pair of axially aligned sleeves at opposite edges of said head, a tie rod extending through each pair of sleeves, a pair of parallel clamping shoes arranged transversely of said tie rods adjacent opposite ends thereof, each of said shoes having its opposite ends mounted on corresponding ends of opposite tie rods, each of said shoes being provided with a centrally disposed slot, an equalizer bar pivotally secured to said spider, the opposite ends of said equalizer bar engaging the centrally disposed slots of said shoes, and means for locking said shoes and said equalizer bar in clamping position.

4. In a molding machine, a head comprising a cylinder and piston rod projecting from said cylinder, a spider rigidly secured to the projecting end of said piston rod, a pair of parallel tie rods secured to opposite edges of said spider, a pair of parallel clamping shoes each mounted loosely on corresponding end portions of both of said tie rods, each of said shoes having a slot in its center portion, and an equalizer bar pivotally secured at its center to said spider, the opposite ends of said equalizer bar loosely engaging said slots to permit independent tilting movement of each of said shoes in its vertical plane.

5. In a molding machine, a head comprising a cylinder and piston rod projecting from said cylinder, a spider rigidly secured to the projecting end of said piston rod, a pair of parallel tie rods secured to opposite edges of said spider, a pair of parallel clamping shoes each mounted loosely on corresponding end portions of both of said tie rods, each of said shoes having a slot in its center portion, an equalizer bar pivotally secured at its center to said spider, the opposite ends of said equalizer bar loosely engaging said slots to permit independent tilting movement of each of said shoes in its vertical plane, and means for locking said shoes and equalizer bar in clamping position.

6. In a molding machine, a head comprising a cylinder having a vertically reciprocable piston therein, a spider rigidly secured to said piston, a pair of parallel clamping shoes secured to opposite edges of said spider, and an equalizer bar engaging said shoes and extending transversely therebetween, the center portion of said equalizer bar being pivotally secured to said piston, whereby said bar transmits the clamping force of said shoes to said piston.

7. In a molding machine, a flask supporting table, a head initially positioned above said table, said head comprising a vertically reciprocable piston for positioning said head relative to said table, a spider rigidly secured to one end of said piston, a pair of clamping shoes secured to said spider, an equalizer bar pivotally secured to said piston and engaging said shoes, and a plurality of rollers rotatably mounted in parallel relationship in a fixed horizontal plane adjacent opposite edges of said head, the lowermost surface of said rollers being slightly below the lowermost surface of the clamping shoes when said shoes are in unclamped position, means for clamping said shoes against a flask supported on said table, means for locking said shoes in clamping position, and means for inverting said table and said head, said piston being operable after such inversion to move said spider and shoes below the level of said rollers whereby a flask initially supported by said table is supported on said rollers.

8. In a molding machine, a flask supporting table, a head initially positioned above said table, said head comprising a spider, a pair of clamping shoes secured to said spider, and a plurality of rollers rotatably mounted in parallel relationship in a fixed horizontal plane adjacent opposite edges of said head, the lowermost surface of said rollers being slightly below the lowermost surface of the clamping shoes when said shoes are in unclamped position, means for clamping said shoes against a flask supported on said table, means for inverting said table and said head, and means for moving said spider and shoes below said rollers after such inversion whereby a flask initially supported by said table is supported on said rollers.

References Cited in the file of this patent

UNITED STATES PATENTS

| | | |
|---|---|---|
| 347,447 | Tabor | Aug. 17, 1886 |
| 1,475,017 | Jones | Nov. 20, 1923 |
| 1,814,416 | Stoney | July 14, 1931 |
| 1,875,285 | Wallace et al. | Aug. 30, 1932 |
| 1,910,354 | Nicholls et al. | May 23, 1933 |
| 1,957,246 | Byerlein | May 1, 1934 |